United States Patent

Link

[11] Patent Number: 5,850,882
[45] Date of Patent: Dec. 22, 1998

[54] GARDEN POWER TOOL

[76] Inventor: Cletus H. Link, Rte. 3 Box 108A, Caledonia, Minn. 55921

[21] Appl. No.: 828,328

[22] Filed: Mar. 28, 1997

[51] Int. Cl.$^6$ .................................................. A01B 33/02
[52] U.S. Cl. ............................. 172/41; 172/112; 172/555
[58] Field of Search .................................. 172/40, 41, 48, 172/53, 54, 84, 88, 94, 376, 377, 112, 555; 56/12.7, 17.5

[56] References Cited

U.S. PATENT DOCUMENTS

| | | | |
|---|---|---|---|
| 2,823,597 | 2/1958 | Kelsey | 172/41 |
| 3,710,870 | 1/1973 | Pfeiffer | 172/40 |
| 3,747,687 | 7/1973 | Bodine | 172/40 |
| 4,421,176 | 12/1983 | Tuggle et al. | 172/41 |
| 4,911,247 | 3/1990 | Kuhlmann et al. | 172/41 |

*Primary Examiner*—Jack W. Lavinder
*Assistant Examiner*—Robert Pezzuto
*Attorney, Agent, or Firm*—John Heyman

[57] ABSTRACT

A hand held garden tool that utilizes rechargeable batteries and a variable speed, reversible motor as its power source. A drive shaft housing serves as a long handle member and contains a drive shaft. The drive shaft and its housing are connected to, and removable from the power unit. The drive shaft extends to a small, compact drive assembly which rotates a short shaft extending to each side. Each shaft holds two tine discs. The curved tines on the tine discs rotate closely around the perimeter of the drive assembly to speedily and thoroughly pulverize the soil and eliminate weeds.

8 Claims, 5 Drawing Sheets

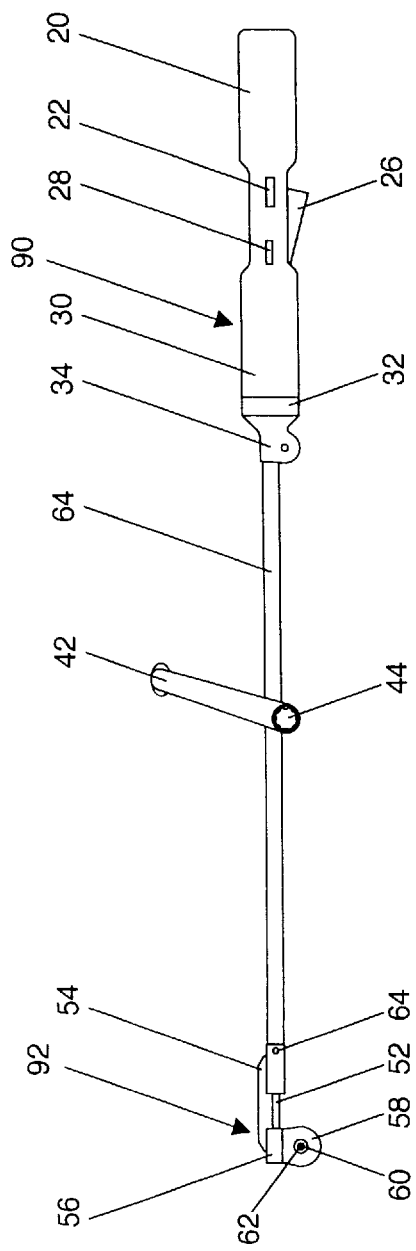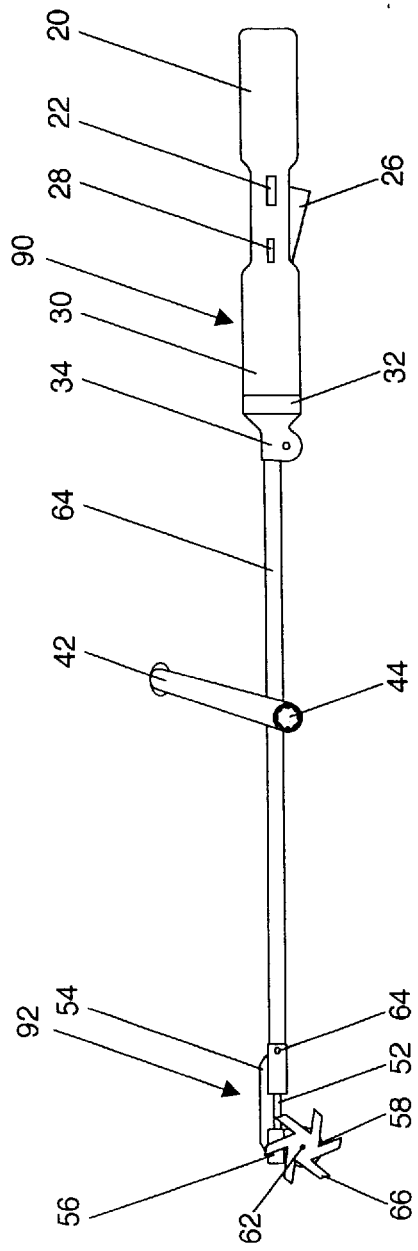

GARDEN POWER TOOL

BACKGROUND- FIELD OF INVENTION

This invention is a hand held power tool for gardeners, specifically for use in preparing the soil for planting and cultivating growing plants.

BACKGROUND- DESCRIPTION OF PRIOR ART

In the past most garden work was done with the common hoe. That is a long wooden handle with a steel blade attached to one end. It requires strength and endurance on the part of the user, and it is slow and tedious work. However, if it is diligently applied, it does a good job of destroying weeds and loosening the soil. The common hoe is still widely used for these chores, mainly because it provides the best control and maneuverability.

In recent years the power tillers and cultivators have been introduced. They come in many sizes and weights. They are powered by small gas engines. The larger and heavier of these work well for tilling a garden before planting, and for cultivating between widely spaced rows. Most are designed for large gardens. Some of the smaller and lighter models work well for cultivating between narrower rows of plants, but they are not the answer for the small gardens with closely spaced plants. They can not be used at all in a randomly planted flower bed.

These machines share several disadvantages. They are inconvenient to prepare for use, requiring the mixing of gasoline and oil. Starting them with a pull rope is neither easy nor reliable. Most require wheels to transport their weight from storage to the garden. Their size and weight makes them hard to manipulate and limits their use to between rows. Their cost to purchase and maintain are seldom warranted for a small garden. These disadvantages preclude their use by many elderly people and anyone with limited strength or abilities. In short, they are not practical for the millions of small, home gardens.

There is also the push-pull hoe or "mulcher". It is a long handle with tines on one end. The tines rotate by a push-pull motion exerted on the handle by the user. It is not powered by any motor. It is controllable and maneuverable between plants, but does a very poor job of destroying weeds and loosening the soil. This can be improved somewhat by going over the same area repeatedly, using still more time and effort in doing so.

Objects and Advantages

The primary object of this invention is to provide a tool which, after a garden plot has been plowed or deep tilled with one of the large, heavy machines, is more convenient, efficient and versatile in preforming the various tasks necessary during the planting and growing period.

Other objects of this invention are to provide a tool for eliminating weeds and loosening the soil during the growing season. For preparing a narrow seedbed of well pulverized soil while leaving the soil between rows rough to retard the growth of weeds. For digging holes for transplants while also pulverizing the soil to be replaced around the roots. For hilling the soil around the plants that require it. That minimizes the time and effort required for these tasks.

Still other objects and advantages of this invention are to provide a tool that is convenient, simple, and reliable to start and use. That is light and simple enough to be used by almost anyone. That is easily manipulated close to, around and between plants. That efficiently utilizes power from rechargeable batteries to eliminate the nuisance of an electric cord dragging over young, tender plants. That allows the operator the precise control of a variable speed at which the tool operates. That is economical to purchase, use, and maintain. That can be conveniently stored in a small space. Other objects and advantages will become apparent from a consideration of the drawings and descriptions.

DRAWING FIGURES

Only the external housing of a power unit are shown on the drawings to illustrate their approximate size and an appropriate arrangement in relation to the tool. The interior working elements of a power unit are commonly known in the prior art and are not shown on the drawings.

FIG. 5 is a side view of the exterior of the tool without the tines.

FIG. 6 is a side view of the exterior of the tool with the tines in place.

Figure 1:
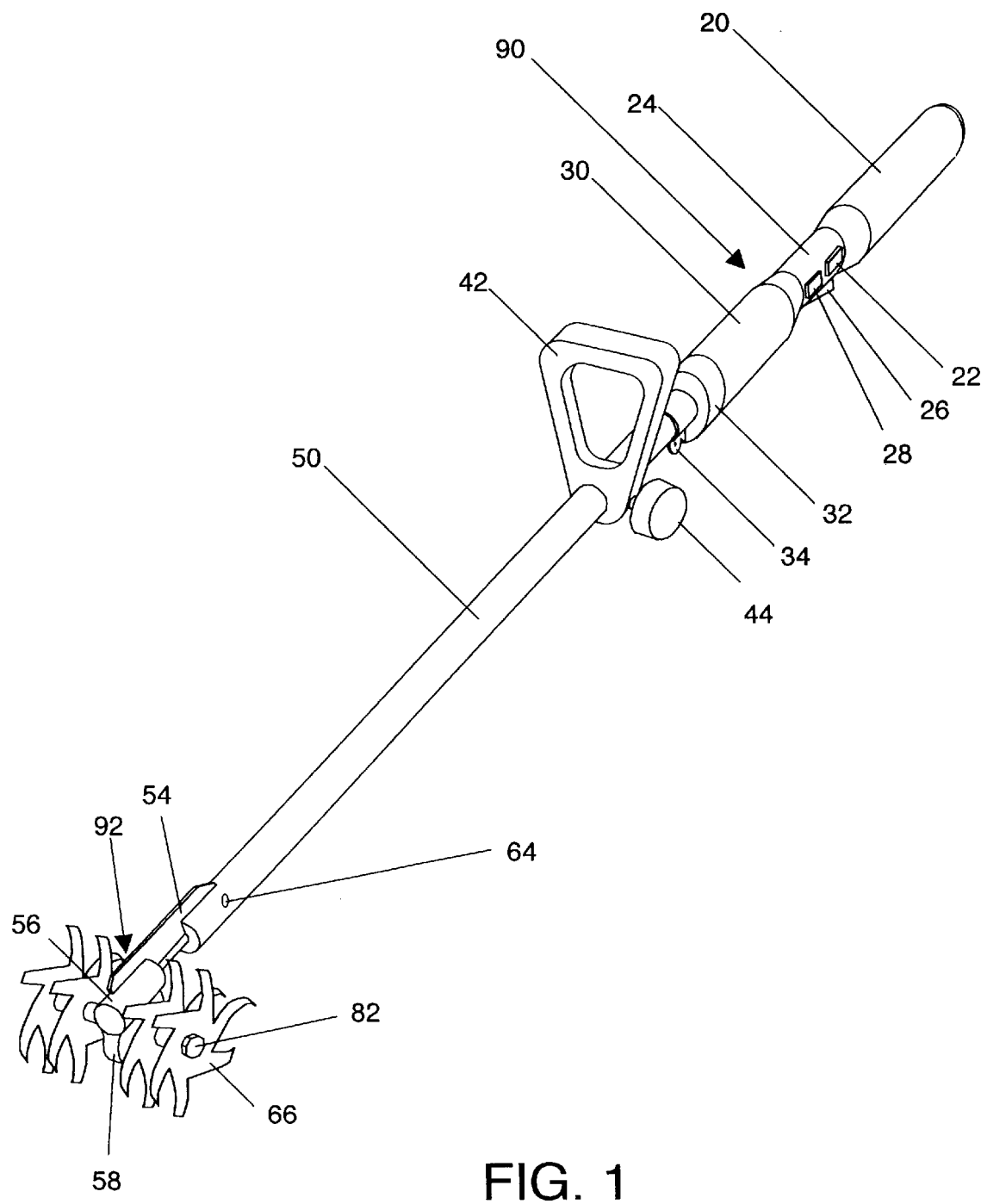
FIG. 1 is a perspective view of the entire exterior of the tool.

| Reference Numerals In Drawings | |
|---|---|
| 20 | battery housing |
| 22 | safety switch control |
| 24 | hand grip |
| 26 | variable speed switch control |
| 28 | reverse switch control |
| 30 | motor housing |
| 32 | planetary gear housing |
| 34 | bolt clamp |
| 42 | handle |
| 44 | hand screw clamp |
| 50 | drive shaft housing tube |
| 52 | drive shaft passage tube |
| 54 | reinforcing plate |
| 56 | worm gear housing |
| 58 | gear wheel housing |
| 60 | tine shaft bearing |
| 62 | tine shaft |
| 64 | oil filler plug |
| 66 | time |
| 68 | drive shaft bearing |
| 70 | drive shaft |
| 72 | worm gear |
| 74 | worm gear bearing |
| 78 | gear wheel |
| 80 | spacer sleeve |
| 82 | cap screw |
| 90 | power assembly |
| 92 | drive assembly |

Description

A preferred embodiment of this tool is shown in FIGS. 1 through 8.

FIG. 1 shows a view of the exterior of the tool. The housing parts are either permanently or removably joined to form one unit which contains the moving parts, the bearings, oil seals, and the lubricant.

A battery housing 20 is joined to a hand grip 24. On the hand grip are switch controls 22, 26, and 28. Hand grip 24 is joined to the rear of a motor housing 30. At the front of motor housing 30 is a planetary gear housing 32. Planetary gear housing 32 is joined to a bolt clamp 34. Bolt clamp 34 attaches to a drive shaft housing tube 50, and allows the removal of power assembly 90 from the tool.

Mounted on drive shaft housing tube 50 is a handle 42 with a hand screw clamp 44 to allow adjusting the position of the handle up or down the tube.

Drive shaft housing tube 50 extends and is joined to a drive shaft passage tube 52. Drive shaft passage tube 52 is joined to a worm gear housing 56. Joined to and below worm gear housing 56 is a gear wheel housing 58. Joined to each side of gear wheel housing 58 is a tine shaft bearing 60 and oil seal. A tine shaft 62 rotates in tine shaft bearings 60.

Joined to the top of worm gear housing 56, to the top of drive shaft passage tube 52, and to the top of the lower end of drive shaft housing tube 50, is a reinforcing plate 54.

A protective shield, not shown, over the top of the tines can be attached to reinforcing plate 54.

A filler hole and plug 64 are on the lower part of drive shaft housing tube 50.

The housing that contains the drive assembly 92 must be small and compact, providing only enough clearance inside to allow the moving parts to move freely. The reasons will be made clear in the operation section of this specification.

Figure 2:
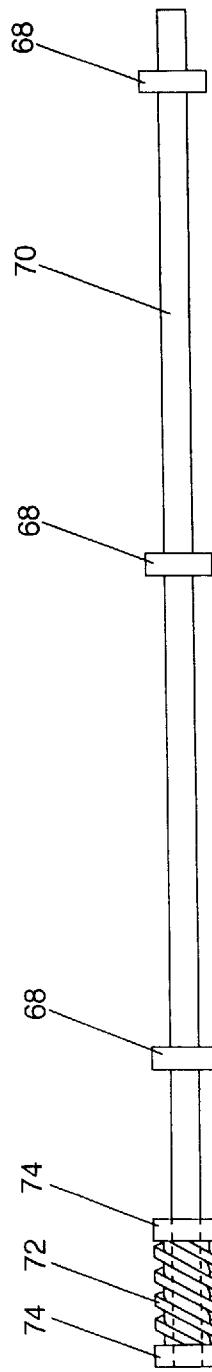
FIG. 2 is a side view of the interior assembly of the tool.
Figure 4:
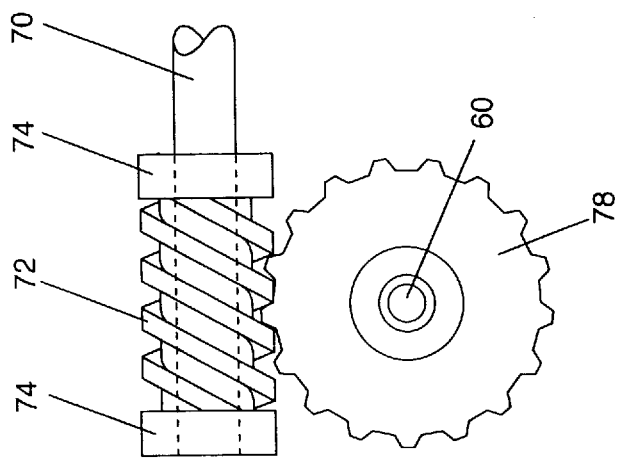
FIG. 4 is an enlarged side view of the worm gear drive.
Figure 3:
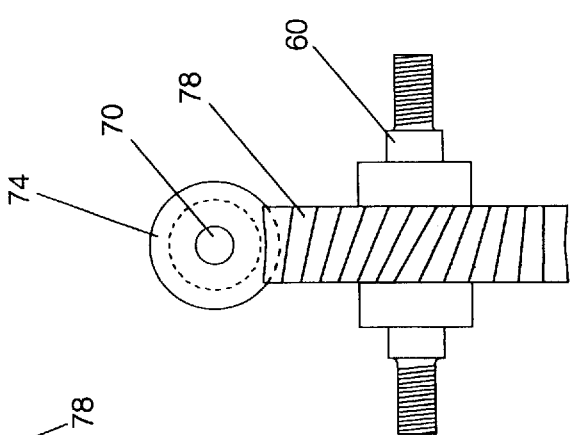
FIG. 3 is an end view of the drive assembly of the tool.
Figure 7:
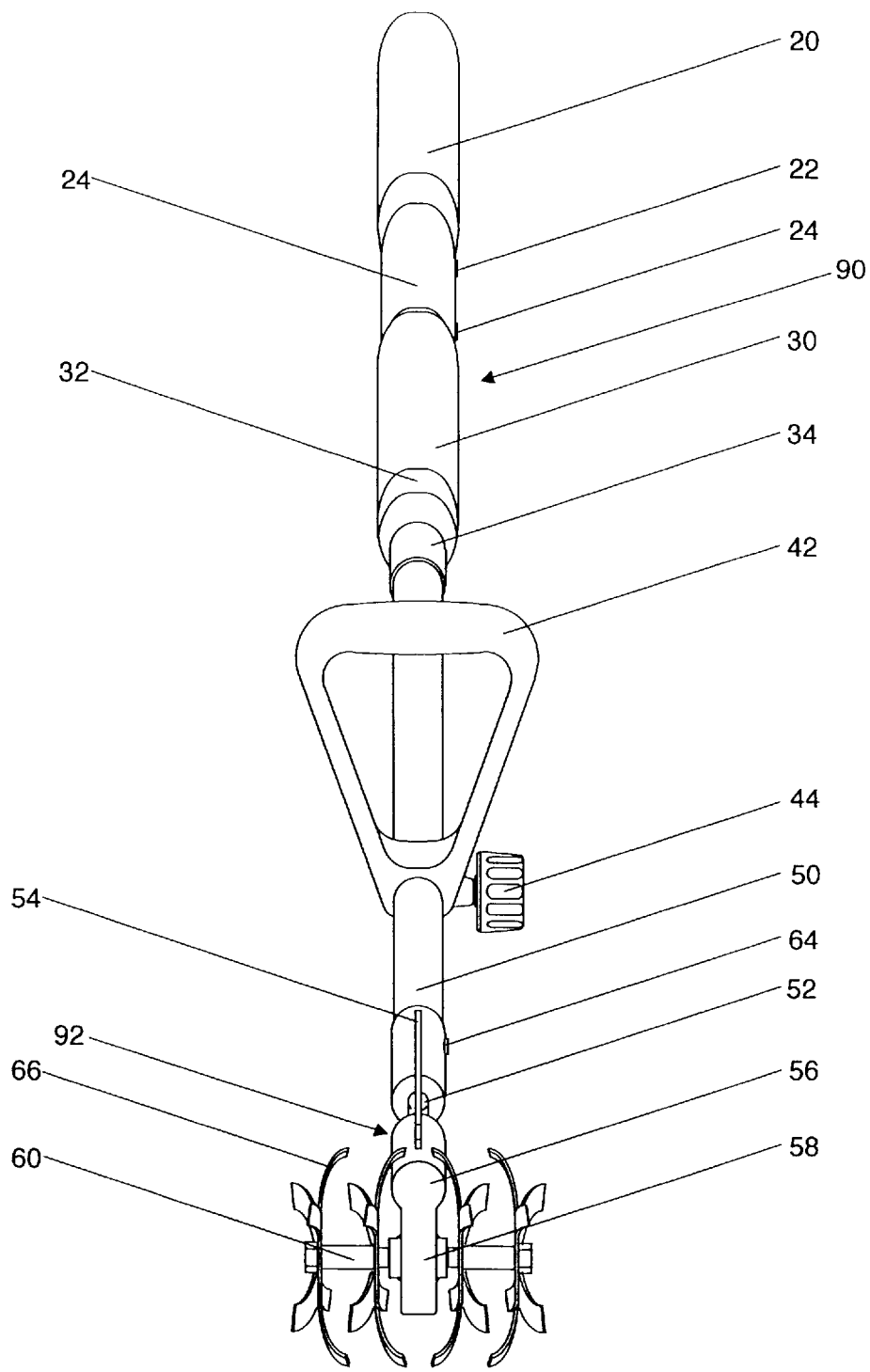
FIG. 7 is a perspective end view from an angle above the tool.

The interior parts of a preferred embodiment of the tool are shown in FIG. 2, 3, and 4. The batteries, switches, motor and planetary gears are commonly known in the prior art and are not shown in the drawings. Their housings are shown in FIG. 1, 5, 6, and 7 to show the approximate size and appropriate arrangement of them necessary to complement the tool.

A drive shaft 70 is splined on the upper end to slip into a splined hub at the center of the planetary gears, allowing power assembly 90 to be removed from the tool by loosening bolt clamp 34.

Drive shaft 70 extends the full length of the tool; through three drive shaft bearings 68; through drive shaft passage tube 52; through a worm gear bearing 74; through and joined to a worm gear 72; and through a worm gear bearing 74 at the end of drive shaft 70 Worm gear 72 drives a gear wheel 78. Gear wheel 78 is keyed or splined to a tine shaft 62 which rotates in the tine shaft bearings 60. Tine shaft 62 has four shoulders, one at each side of gear wheel 78 to bear the lateral thrust of tine shaft 62 against the tine shaft bearings 60. Tine shaft 62 has two more shoulders to the outer sides of the tine shaft bearings 60. The inner tines 66 are tightened against these shoulders by two threaded spacer sleeves 80. The parts of tine shaft 62 outside the shoulders are threaded to match spacer sleeves 80. The outer tines 66 are secured by two cap screws 82 in the outer half of spacer sleeves 80. The end of tine shaft 62 and spacer sleeve 80 on the right side of the tool have a left hand thread to keep the tines 66 on that side tight against the shoulder.

Figure 8:
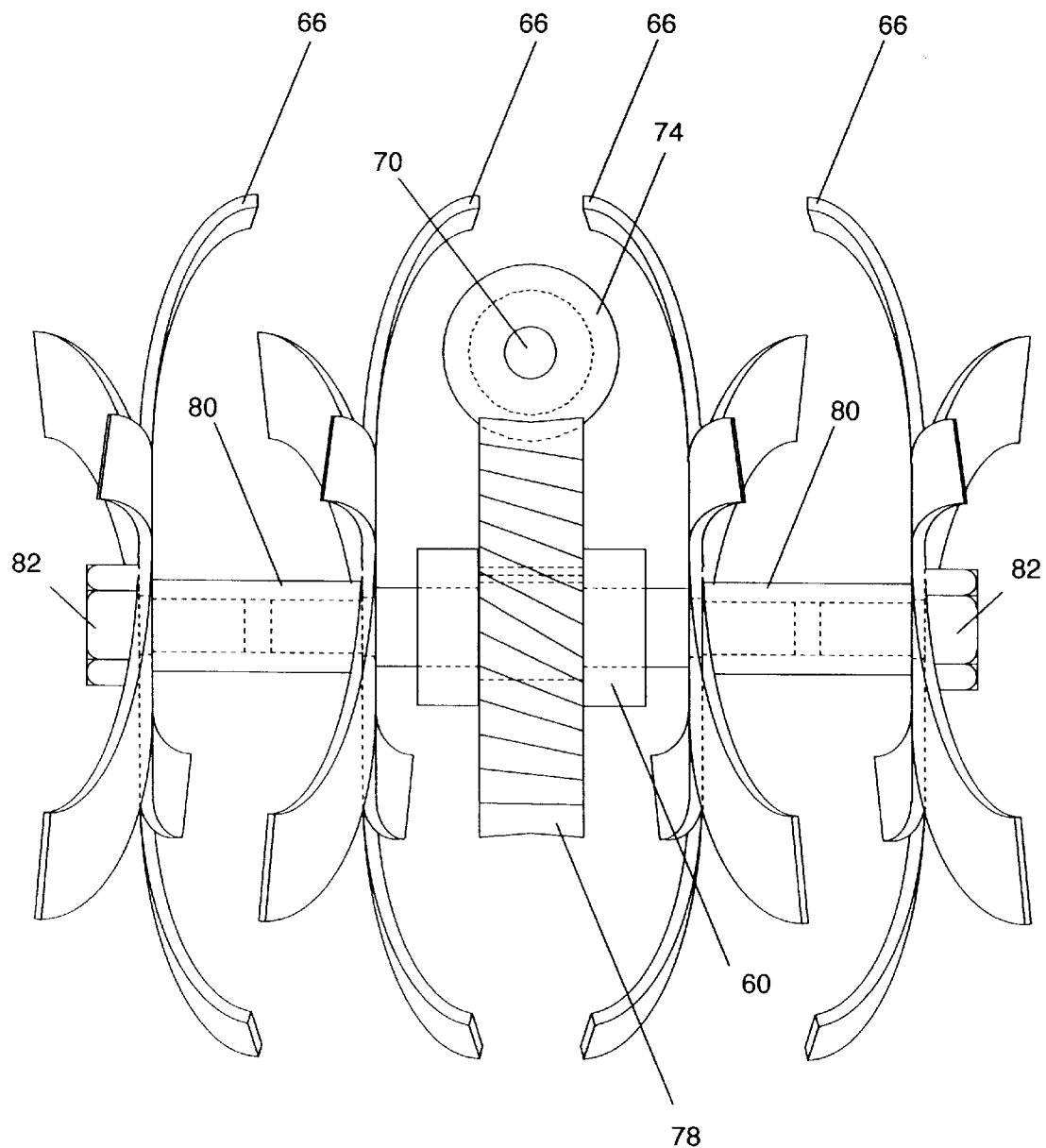
FIG. 8 is an enlarged front view of the worm gear drive with the tines mounted in place.

The tines 66 are cut from sheet steel and have a central solid disc with a hole to accommodate the tine shaft 62. The tines' blades protrude beyond the solid discs to a diameter of 4¼ inches. The tines are alternately curved as best shown in FIG. 8 of the drawings.

The shape and dimensions of the following parts are critical to the efficient operation of the tool. The reasons will be made clear in the "Operation" section of this specification.

Drive shaft 70 is not more than ¼ inch diameter. Drive shaft passage tube 52 is a thin wall tube that just clears drive shaft 70 and is two inches long.

Worm gear 72 is ⅝ inch diameter and one inch long. Worm gear bearings 74 are ¼ inch long and ⅝ inch outside diameter. Gear wheel 78 is ½ inch wide and 2 inches diameter. Tines 66 are 4¼ inches diameter and 1/32 to 1/16 inch thick.

The weight of a preferred embodiment of the tool is just under 4½ pounds including four tines using bronze for the interior parts and steel for the tines. The weight of a typical power unit with batteries is estimated to be 3 pounds for a total operating weight of about 7½ pounds.

Operation

A preferred embodiment of the tool uses a power assembly well known in the prior art which is only briefly described here. The power unit uses interchangeable, rechargeable, plug-in type batteries as a power source. A conventional motor of the smallest diameter and lightest weight available that will supply the required power is used.

The hand grip 24, contains three switches. A safety switch 22 shuts off the power when the hand is removed from the hand grip. A variable speed switch 26 allows precise control of the speed of the tines. A reverse switch 28 allows the rotation of the tines to be reversed for purposes such as leveling the soil or removing long grass or weeds from the tines.

At the front of the motor, planetary gears with a splined center hub delivers rotary power to the splined drive shaft 70 of the tool. The planetary gears ratio combined with the worm gear drive ratio should deliver a speed range that is variable between zero and 300 rpm at the tines.

The dimensions given in the description are vital to the structure of a small, compact drive assembly 92. The small, compact drive assembly allows the tips of some tines 66 to rotate very near the drive shaft passage tube 52. It also allows these tips to rotate around the top perimeter of the worm gear housing 56 and to penetrate the soil at the necessary depth below the gear wheel housing. This configuration is critical to the efficient performance of the tool. This small, compact assembly will destroy weeds, thoroughly mix and pulverize the soil speedily, and do so using a minimum amount of battery energy.

A drive shaft 70, splined into the hub of the planetary gears and rotating in the drive shaft bearings 68, delivers rotary motion to the worm gear 72. The worm gear drives the gear wheel 78 which turns the tine shaft 62.

The tool may be used with four tine discs or two when working in small spaces such as between closely spaced plants. Two of the tine discs are removed by taking out the cap screws 82, removing the spacer sleeves 80, and replacing them with a conventional nut to hold one tine on each side.

Summary, Ramifications and Scope

From the foregoing descriptions it should be evident that the size, shape and configuration of the parts make it unique in the field of garden tools.

It is light, convenient, versatile, and maneuverable.

It adapts itself to a variety of uses in the garden.

It will be economical to produce and use.

It is easily controlled while performing with maximum speed and efficiency.

It thoroughly mixes and aerates the soil, and destroys weeds.

It is simple and practical to use and maintain.

It will be used by the many people who are reluctant to use the larger, heavier machines.

It performs using a minimum amount of energy, making it adaptable to a light, convenient source of energy such as rechargeable batteries.

The foregoing descriptions contain many specificities. These should not be construed as limiting the scope of the invention, but rather as providing illustrations of one preferred embodiment. Many variations are possible. For example, some of the parts could have other shapes and dimensions such as an oval or a hexagonal shaped drive shaft tube; the tool could be made longer, or shorter and smaller for using with one hand; the tines could be replaced with other implements such as rotary brushes or a rotary wire tined rake; the power could be provided with a very small, light gas engine; the electrical components could be placed differently in relation to the tool; it could be driven by a hydraulic pump at the motor and a hydraulic motor at the tines. Larger batteries, to last longer on a single charge could be carried by a shoulder harness or in a backpack. Thus the scope of the invention should be determined by the appended claims and their legal equivalents rather than by the descriptions and examples of the embodiment given.

I claim:

1. A lightweight, powered hand-held garden tool utilizing rechargeable batteries, comprising:

an elongated handle having first, second and third portions;

said first portion having a power assembly including a rechargeable battery means, a motor housing containing a variable speed, reversing motor means and a hand grip means inter -coupling said motor housing and said rechargeable battery means, said hand grip means containing a switch means for varying the speed and for reversing said motor means;

said second portion having a drive assembly including drive shaft housing containing a drive shaft, said drive assembly of said second portion including means for attaching and detaching a first end thereof from said power assembly of said first portion; and said third portion having a tool assembly including a gear housing with a gear means engaging said drive assembly at a second end thereof, said tool assembly further including a rotating, wheel-shaped tool means mounted on a short shaft attached transverse to said drive shaft of said second portion by said gear means;

whereby said rotating, wheel-shaped tool means mounted on said short shaft attached to said gear means is caused to rotate by said motor at a speed and direction determined by said switch means actuating said drive shaft.

2. The powered hand-held garden tool of claim 1 wherein said rotating, wheel-shaped tool means comprises: at least two wheel-shaped tine means each having plural tines having a predetermined shape for efficient soil tilling, said at least two rotating, wheel-shaped tine means mounted on said short shaft on either side of said second end of said second portion drive assembly so that certain ones of said predetermined shaped tines pass just over said gear housing of said tool assembly of said third portion.

3. The powered hand-held garden tool of claim 1 wherein said means for attaching and detaching said first end of said second portion from said first portion comprises: a bolt clamp attached to said drive shaft housing of said second portion.

4. The powered hand-held garden tool of claim 1 further comprising: an adjustable handle means slideably engaging said second portion by way of a screw clamp encircling said drive shaft housing of said second portion.

5. The powered hand-held garden tool of claim 1 in which said gear means comprises: a worm gear means so that in combination with said motor means provides a predetermined gear ratio for causing said rotating tool means to rotate up to 300 revolutions per minute.

6. The powered hand-held garden tool of claim 1 in which said short shaft attached to said gear means on said third portion is located below said drive assembly of said second portion so as to permit optimum soil penetration of said rotating, wheel-shaped tool means.

7. The powered hand-held garden tool of claim 1 wherein said first, second and third portions are constructed of lightweight materials in which each of said housings thereof are basically tubular in configuration for strength, and in which the total operating weight is about seven and one-half pounds.

8. The powered hand-held garden tool of claim 1 wherein said switch means further comprises: a speed control means for controlling the speed of rotation of said rotating, wheel-shaped tool means and a reversing switch for controlling the direction of rotation of said rotating, wheel-shaped tool means.

* * * * *